Sept. 28, 1971     H. T. SAWYER     3,608,108
MATERIAL CONDITIONING BY ACOUSTIC ENERGY
Filed June 11, 1969     3 Sheets-Sheet 1
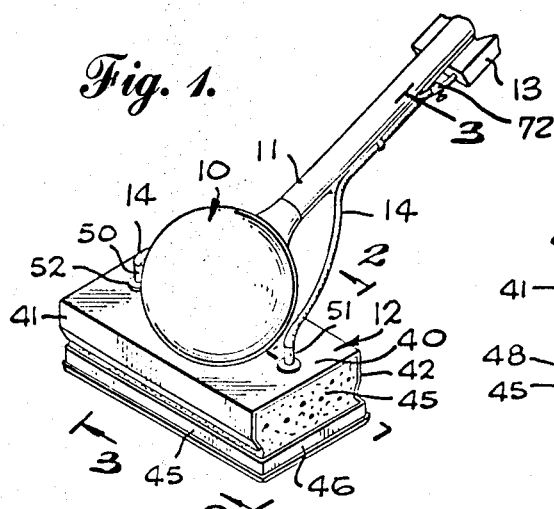
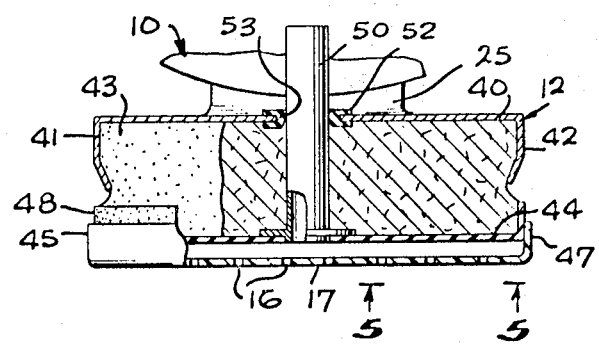
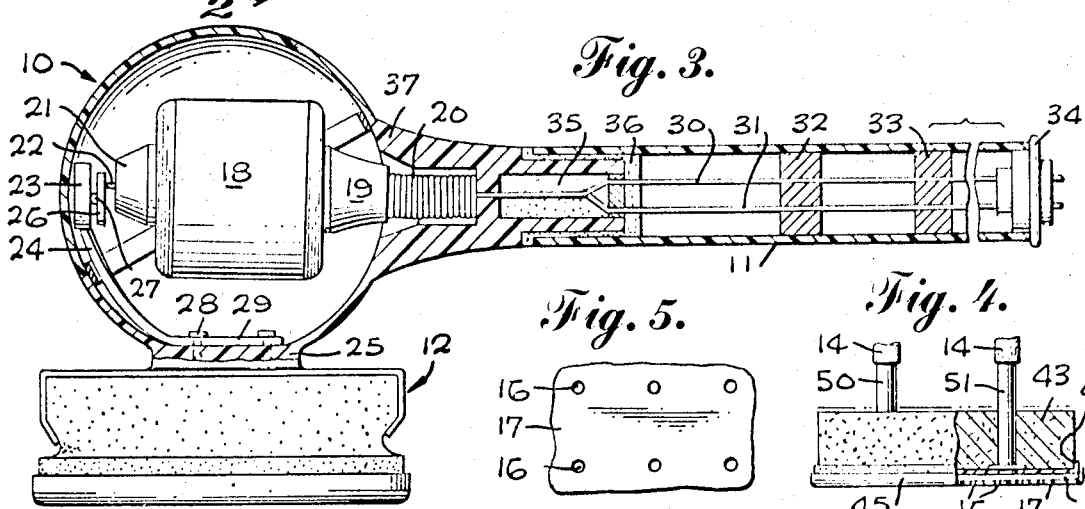
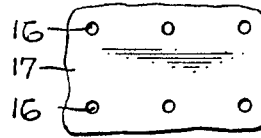
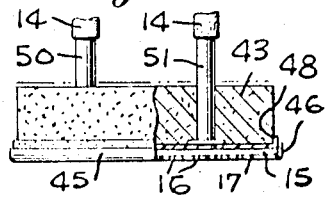
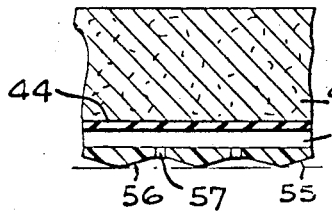
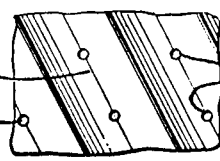
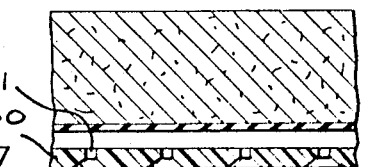
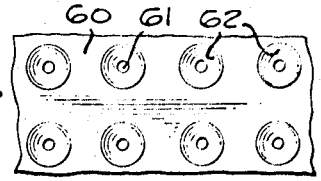
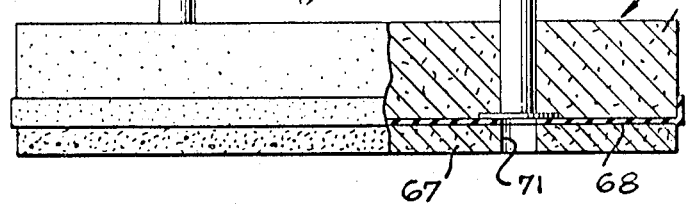
INVENTOR.
HAROLD T. SAWYER
BY
Beehler & Arant
ATTORNEYS

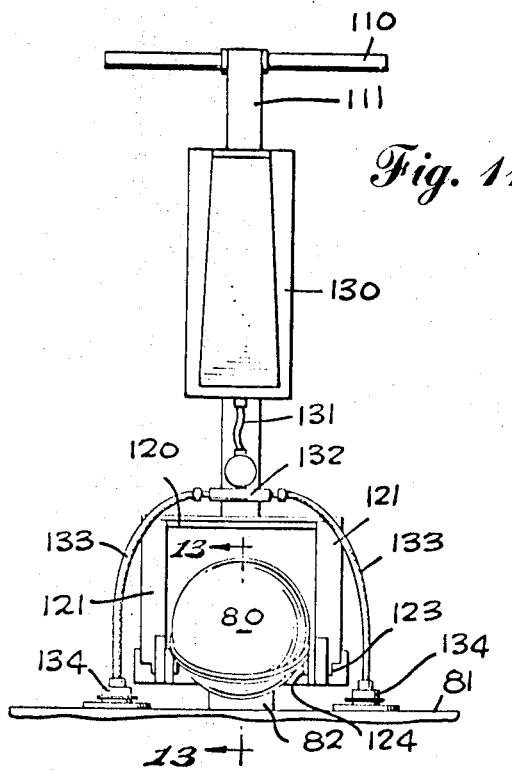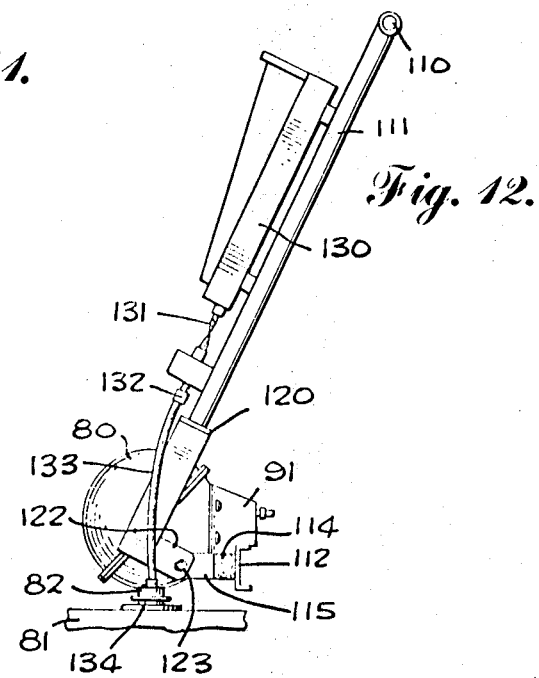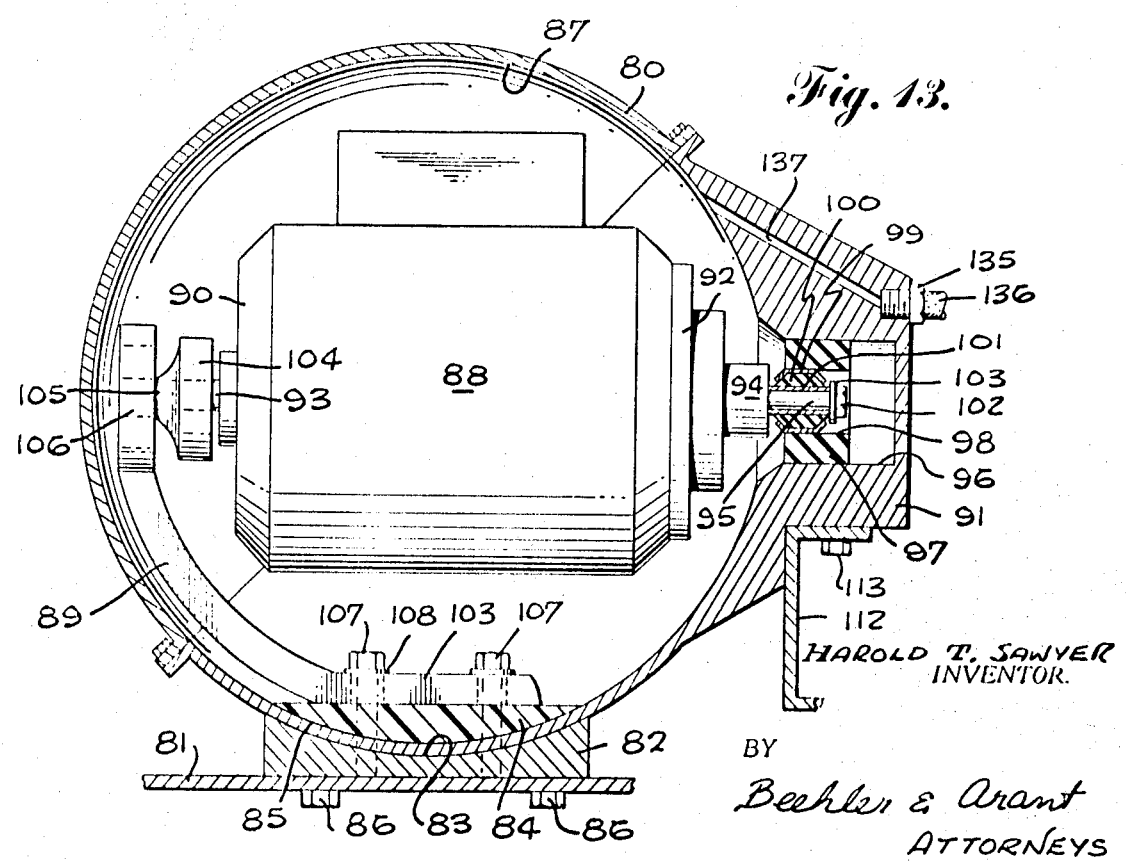

INVENTOR.
HAROLD T. SAWYER
BY
Beehler & Arant
ATTORNEYS

United States Patent Office 3,608,108
Patented Sept. 28, 1971

3,608,108
MATERIAL CONDITIONING BY ACOUSTIC ENERGY
Harold T. Sawyer, Pacific Palisades, Calif., assignor of fractional part interest to Vernon D. Beehler, Los Angeles, Calif.
Continuation-in-part of applications Ser. No. 631,736, Apr. 18, 1967, now Patent No. 3,507,695, dated Apr. 21, 1970, and Ser. No. 642,077, May 29, 1967, now Patent No. 3,497,898, dated Mar. 3, 1970, both applications being continuations-in-part of application Ser. No. 480,310, Aug. 17, 1965, now Patent No. 3,357,033, dated Dec. 12, 1967. This application June 11, 1969, Ser. No. 832,180
Int. Cl. B05c 8/04; D06p 7/00
U.S. Cl. 8—147                                                      7 Claims

ABSTRACT OF THE DISCLOSURE

Sinusoidal vibration is generated by the revolving movement of a motor mass about its eccentric bearing and mounted in a resilient shell and passed through a single bracket to a pedestal on the shell. The pedestal is in alignment with a line perpendicular to the surface of the material to be conditioned and radial with respect to the motor mass. A tool holder on the pedestal is designed to vibrate at near its own natural frequency in the low sonic range and matched to the forcing frequency of the motor mass. A hollow tool is also designed to vibrate at near its own frequency. A conditioning liquid, such as cleaning fluid or dye, feeds into the hollow tool and with the motor providing the forcing frequency a compressional sound wave is set up in the tool holder and transmitted in a direction perpendicular to the surface through a cellular foam material into the tool, there setting the conditioning liquid into a state of intense cavitation energy, thus causing it to foam as it is driven outwardly through perforations in the tool to the material to be conditioned. The foam continues to be cavitated which subjects the fibers of the material to a transitory vacuum and alternate pressure exposure that frees the fibers of all foreign matter.

This is a continuation in part of copending applications, Ser. No. 631,736, filed Apr. 18, 1967, and now Pat. No. 3,507,695, issued Apr. 21, 1970; and Ser. No. 642,077, filed May 29, 1967, and now Pat. No. 3,497,898, issued Mar. 3, 1970. Both of said copending applications were continuations in part of application 480,310, filed Aug. 17, 1965, now Pat. No. 3,357,033, issued Dec. 12, 1967.

RESUME OF PRIOR ART

Fabric cleaning devices heretofore prevalent and in generally use customarily employ mechanical scrubbing tools or brushes. In certain rug and carpet cleaning appliances the cleaning fluid is applied to the brushes and thence to the rug surfaces. The fluid is then scrubbed into the rug or carpet surface by action of the brushes during which operation some of the fluid foams and turns to lather. The scrubbing action tends to rub dirt from the upper surface portion only of those fibers actually in contact with the brush bristles. Further cleaning action is dependent wholly upon the detergent action of chemicals within the fluid. Dirt at the base of the fibers or pile is relatively untouched. In order to operate a machine of the type described, a relatively heavy, powerful motor is employed, the brush holding discs or assembly are quite large and heavy and the machine as a whole has appreciable weight. Since a scrubbing action is depended upon, the pile of the rug or carpet, for example, is brushed in the direction of the mechanical motion of the brush holding assembly and because of the weight of the appliance and the fluid necessary for this operation the fibers are pressed flat against the carpet backing. This results in only a portion of the pile being cleaned, probable serious damage to the texture of the pile and the mechanically forcing of dirt and fluid to the base of the fibers and into the backing. Despite finishing operations which include vacuuming to remove excess fluid and dirt, and a brush or squeegee cycle to raise the pile from its compressed position, all of the dirt cannot be reached with these conventional appliances and methods thereby leaving dirt at the base of the fibers, many of which are still flattened and matted in the remaining fluid. The entire operation generally has only cleaned the upper surfaces of the fibers and in numerous cases has damaged the pile in the center of the work area while not being able to properly clean edges and corners which must be completed by hand methods. This accounts for differences in texture between the open areas of carpeting as compared with edge or corner areas.

Further still, because of the mechanical motion of the scrubbing devices, whether it be rotary or oscillating, numerous passes over the same relative paths must be made to assure proper coverage of the work area. Time is of the essence in a competitive market and repetitive operations are time consuming and expensive.

Although sonic energy devices exemplified by applicant's Pat. 3,310,129, Pat. 3,357,033, and copending application Ser. No. 631,736, filed Apr. 18, 1967; and Wyczalek Pat. 3,166,773, for example, disclose devices for making use of sonic energy in the low sonic range for conditioning or cleaning, these devices lack certain appurtenances which are needed to employ the principle for complete conditioning of a material. Devices using ultra sonic energy for cleaning would be too costly for everyday use and, in the hands of inexpert users, the effect of such frequencies is too hazardous for ordinary household appliances.

It is therefore among the objects of the present invention to provide a new and improved method for conditioning materials which makes use of sonic energy in the application of a conditioning fluid to the material.

Still another object of the invention is to provide a new and improved method for portable hand operated fabric conditioning, as for example cleaning or dyeing, which is substantially low powered and highly efficient in the employment of sonic energy and which is capable of cavitating a fluid to a foaming condition while being applied to the fabric and while the foam is in contact with the fabric, thereby to thoroughly clean or dye to an appreciable depth, while at the same time making it possible to revitalize the condition of the fibers of the fabric after completion of the operation.

Still another object of the invention is to provide a new and improved fabric cleaning method which is substantially portable and easy to operate by hand; the method, being such that it consumes relatively little energy, can be applied to the fabric surface with particular ease, which is of such character that it can be operated close to the baseboard when used for cleaning rugs and carpets on the floor, which is capable of reaching into corners, and which at the same time is of such character that there is no mechanical scrubbing of the fabric during the cleaning operation.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a side perspective view of the fabric conditioning device capable of making use of the method shown in a position applied to a surface to be conditioned.

FIG. 2 is a fragmentary cross-sectional view taken on the line 2—2 of FIG. 1.

FIG. 3 is a longitudinal sectional view taken on the line 3—3 of FIG. 1.

FIG. 4 is a front elevational view of the tool partially broken away.

FIG. 5 is a fragmentary bottom view taken on the line 5—5 of FIG. 2.

FIG. 6 is a fragmentary sectional view of another form of the work contacting plate.

FIG. 7 is a fragmentary bottom view of the plate of FIG. 6.

FIG. 8 is a fragmentary sectional view of another form of work contacting plate.

FIG. 9 is a fragmentary bottom view taken on the line 9—9 of FIG. 8.

FIG. 10 is a front elevational view partially in section showing still another form of tool.

FIG. 11 is a front elevational view of the device equipped with a modified type of mounting.

FIG. 12 is a side elevational view of the device of FIG. 11.

FIG. 13 is an enlarged fragmentary longitudinal sectional view taken on the line 13—13 of FIG. 11.

Figure 14:
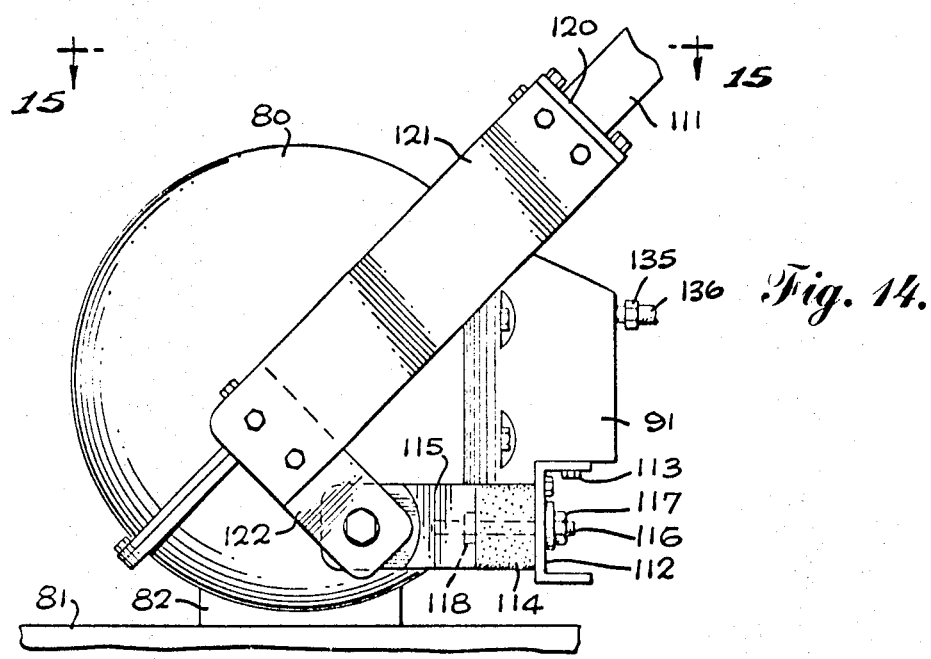
FIG. 14 is an enlarged side elevational view of the modified mounting with portions broken away.

In the device which has been chosen to illustrate how the method is employed there is provided a substantially spherical thin wall hollow shell 10 provided with a handle 11 and a plate beam tool holder 12 capable of being vibrated at or near a frequency approaching resonance. A reservoir 13 for cleaning fluid is fastened to the handle 11 and fluid supply tubes 14 conduct cleaning fluid through the tool holder wherein the cleaning fluid is fed to an accumulator chamber 15 from which it is ejected through a multiplicity of perforations or orifices 16 in a work contacting plate beam 17 capable of being vibrated at or near a frequency approaching resonance.

Within the shell 10 there is mounted a motor 18, one end 19 of which has a resilient isolation mount 20 here taking the form of a spring. At the other end 21 of the motor a motor shaft 22 has an eccentric device installed in a bearing 23 which comprises the upper end of a pedestal 24, the pedestal in turn being secured at a single location to a block 25. More particularly the bearing 23 is provided with an eccentric disc 26 rotatably mounted on a stub shaft 27 and the motor shaft 22 is nonrotatably mounted on the eccentric disc 26 at an eccentric location relative to the axis of the stub shaft 27. Accordingly, when the motor 18 is set in operation and the motor shaft 22 rotates, the eccentric disc 26 is simultaneously caused to rotate about the axis of the stub shaft 27. This operation generates a conical circulatory movement of the motor about its longitudinal axis with the base of the cone being at the eccentrically mounted end and the apex of the cone being at the resilient isolation mount 20. The motor thus rotates about an axis substantially coincident with the stub shaft 27 of the eccentrically designed assembly on the pedestal and the axis of the opposite end 19 of the motor. The sinusoidal force thus generated by the rotating mass of the motor is passed through the pedestal 24 to the block 25 and in that way to the shell 10 and thus to the plate beam tool holder 12 for use of the sonic energy generated.

It is significant that the block 25 is in radial alignment with the axis about which the motor mass operates and is approximately in line transversely with the center of mass of the motor. Bolts 28 fasten a base 29 of the bracket 24 to the block 25. Lead wires 30 and 31 which conduct electricity to the motor pass through staggered sound blocking wafers 32 and 33 in the handle to a cap 34 where they can interconnect with an appropriate cord. A plotting 35, 36 of an appropriate damping resin material may be employed to anchor the wires 30, 31 and also to fasten the handle 11 to a boss 37.

The plate beam tool holder which heretofore has been indicated generally by the reference character 12 consists of a tool holding plate beam 40 which anchors directly to the block 25 by an appropriate conventional attachment, depending upon the materials employed for the block and the tool holding plate beam. When the materials are stainless steel, they may be welded, or when plastic they may be attached by an appropriate compatible or soluble adhesive, or on occasions formed and assembled as a single piece. Opposite sides 41 and 42 of the tool holding plate beam 40 are bent slightly inwardly in order to effectively retain a sonic energy transmitting material pad 43 which may be of relatively soft, high density, open pore cellular substance capable of being vibrated at or near its own natural frequency, such for example, as industrial open pore urethane. The pad 43 is preferably bonded to an impervious back-up plate beam 44 which has already been made reference to as forming the inside wall of the accumulator chamber 15. The work contacting plate beam 17 has peripheral flanges 45, 46, 47, etc. which overlie complementary flanges 48 of the back-up plate beam 44 and to which they are bonded to make a sealed connection.

Tubular posts 50 and 51 are installed through their respective locations in the back-up plate beam 44 and serve as connections for the tubes 14. The post 50, as shown in FIG. 2, extends through grommet 52 which outlines holes 53 through the tool holding plate beam 40.

Although the lower surface of the work contacting plate beam 17 has been shown as one made perfectly smooth, some circumstances may suggest a somewhat rougher work contacting plate beam, like the work contacting plate beam 55 shown in FIGS. 6 and 7. On the face of the work contacting plate beam 55 are diagonally directed depressions 56 which extend across the lower face of the plate beam 55 and substantially uniformly spaced perforations 57 communicate between the accumulator chamber 15 and the depressions 56 along their respective center lines.

Still another form of work contacting plate beam 60 is shown in FIGS. 8 and 9. For this construction perforations 61 communicate with respective individual pockets 62 which are spaced from each other on the lower face of the plate beam 60 as shown in FIG. 9.

In other words, the masses, sizes and relative positions of the sundry parts of the device are designed to vibrate at or near their respective natural frequencies when vibrated by the eccentric motor mass operating at a selected power input.

It will also be understood that there may be supplied for use with the plate beam tool holder 12 a plate beam assembly 65 as shown in FIG. 10, the assembly being one consisting of a sonic energy transmitting pad 66, a work engaging pad 67 and a carrier plate beam 68 to which both pads are bonded by an appropriate adhesive. Posts 69 and 70 are mounted upon carrier plate beam 68 whereby to transmit liquid through the pad 66, the carrier plate beam 68, and through a passage 71 in the work engaging pad 67. In this way liquid of the type desired may be passed directly and uniformly to the surface upon which work is to be performed where the work engaging pad 67, when in condition of resonance, makes use of the liquid in treating the surface of the work.

In the embodiment of the invention illustrated in FIGS. 11 through 15, inclusive, a shell 80 is shown mounted on a tool holding plate 81 by means of an outside block 82 having a hemispheroidal recess 83 and an inside block 84 having a lower face 85 shaped to match the adjacent portion of the interior of the shell 80. The inside block 84 is preferably of Fiberglas reinforced synthetic resin welded at the lower face 85 to the inside surface of the shell. The tool holding plate 81 can be of aluminum or stainless steel, in which event the outside block 82 also may be made of matching aluminum or stainless steel. The tool holding plate 81 is attached by means of bolts 86.

In operation the appliance is first set up as shown and described in connection with FIGS. 1 through 5 inclusive. The reservoir 13 is filled with cleaning fluid; the appliance is placed upon the surface to be cleaned, the motor started and fluid shut-off valve 72 is opened to full flow condition. The valve 72 need not be a regulating valve, since it can be arranged in full open position to supply sufficient fluid under circumstances wherein the call for fluid will be a constant one depending upon the structure of the appliance. Liquid then flows through the tubes 14 into the accumulator chamber 15 filling the chamber. The liquid in the chamber 15 will be in a condition approaching resonance, and cavitation will begin by action of the machine and the liquid thus in a condition approaching resonance. The liquid will be ejected as foam through the multiple perforations 16 onto the fabric, uniformly throughout the area of the plate beam 17. Because the liquid is in a state of cavitation, an intense energy force is created within the accumulator chamber 15 and as it emerges from the perforations 16, it will emerge in the form of a foam as it is cavitated into the fabric. As the operation of the appliance continues, cavitation will continue to exist in the foam as it surrounds the fibers of the fabric and passes through and around the pile of the fabric, if it be a rug or carpet, to the anchoring base of the fibers. This will be sufficient to likewise place the individual fibers in a condition of resonance in the form of individual cantilever beams, accounting more and more for the efficient cleaning action of the appliance. Since there is substantially constant emission of foam through the perforations 16, and constant cavitation within the liquid, the vibrating plate beam 17 and all that it supports will rest but very lightly on the surface on which the work is being performed and the appliance can then be moved steadily and freely, and with little physical exertion over all portions of the surface, near the base board and into the corners. The work progresses as described until all portions of the work have thus been treated with the cavitation cleaning action within the fabric.

The shut-off valve 72 is then closed and the resonating appliance is then guided over the surface to continue cavitation of the foam within the fibers and the fibers themselves to complete the cleaning operation.

Thereafter the foam and the dirt which it has gathered can be removed either by means of a commercial wet vacuum cleaning device or vacuumed after the material is dry. Should not all of the foam be capable of removal in the first instance as described, the fabric cleaning device as heretofore described with the liquid cleaner shut off, is again passed over the surface during which operation the fibers will also vibrate at or near their natural frequency, and the resultant vacuum action of the cavitation induced in moisture around the fibers will draw the remaining residual foam and moisture to the surface at which time it can be removed as previously described by a vacuum device or squeegee. Mechanically induced vacuuming will assist in raising the fibers forming the nap. The cavitation action described not only serves to keep fibers of the pile or fabric separate and untangled but also serves to remove excess moisture from the bottom of the pile so that the material being only moist and not wet at the conclusion of the treatment will dry with reasonably rapidity. Because of the cavitation action of the cleaning device as described it is not necessary to follow up the operation with a brushing operation in order to have the fibers being cleaned stand properly and separately.

In such a cleaning operation the fibers, to which the cavitating foam has been applied, experience compressional sound waves launched from the vibrating work engaging plate beam surface which travel in the direction perpendicular to the surface of the material and the released sonic energy of very high amplitude and intensity penetrates the rug fibers and causes the fibers to freely vibrate at or near their natural frequency as individual cantilever beams. The resultant vibration of the fibers in direct contact with the foam causes an intense activation of the foam surrounding the fibers. It is the acoustical activation thus produced which does the effective cleaning. The foam which is driven and cavitated within the fibers is understood to be in a condition such that there are what may aptly be described as millions of small bubbles and these bubbles in physical contact with the fibers, continuously undergo alternate cycles of pressure and vacuum. It is during this vacuum portion of the cycle that the major cleaning takes place since the foam, and fibers, undergo an intense vacuuming caused by the implosion effect of the bubbles under pressure which pulls the dirt from the fibers and transfers the dirt to the foam. Particularly effective cleaning results have been experienced at frequencies in the low sonic range, preferably between 50 to 500 cycles per sound.

It will be further understood that by having the sinusoidal force action generated by the motor mass applied at only one location to the resonating shell, substantially all of the energy is funneled through that pedestal mounting to the vibrating plate beam structure and the frequency of that assembled structure is designed to be in phase for best results.

In the embodiment of the invention illustrated in FIGS. 11 through 15, inclusive, a shell 80 capable of being resonated is shown mounted on a tool holding plate beam 81 by means of an outside block 82 having a hemispheroidal recess 83 and an inside block 84 having a lower face 85 shaped to match the adjacent portion of the interior of the shell 80. The inside block 84 is preferably of Fiberglas reinforced synthetic resin welded at the lower face 85 to the inside surface of the shell. For most purposes the tool holding plate beam 81 can be of aluminum or stainless steel, in which event the outside block 82 is also made of matching aluminum or stainless steel, the tool holding plate beam 81 being attached to the outside block 82 by means of bolts 86 which extend through the shell 80 and into the inside block 84.

Within the shell 80 is a chamber 87 which provides ample space for the mounting of a motor 88. As in the first described form of the cleaning device there is a single pedestal or bracket 89 for mounting one end 90 of the motor 88 and a boss 91 for mounting the other end 92 of the motor. A motor shaft 93 at the end 92 is provided with an extension 94 on which is a stub shaft 95, preferably of synthetic plastic resin material, which in turn is supported in a recess 96 of the boss 91. The extension 94 is attached by some appropriate conventional means to the motor shaft 93. An annular bushing 97 has a bore 98 which accommodates a retention sleeve 99 with a pressed fit. The retention sleeve 90 may be press fit to the bushing 97. A mounting or diaphragm 100 of resilient material is confined by the retention sleeve 99 and extending through the retention sleeve 99 is a cylindrical sleeve 101 which surrounds and accommodates the stub shaft 95. A nut 102 and washer 103 serve to retain the mounting or diaphragm 100 and retention sleeve on the stub shaft 95.

At the other end 90 where the motor shaft 93 protrudes there is provided an eccentric disc 104 fixed nonrotatably to the motor shaft, the eccentric disc 104 having a stub shaft 105 revolving within a bearing connection 106 on the upstanding end of the pedestal 89. The opposite end 103 of the pedestal 89 is securely attached to the outside block 82 by means of bolts 107 which extend through nylon or other appropriate plastic flanged bushings 108, to electrically isolate them from the bracket.

Figure 15:
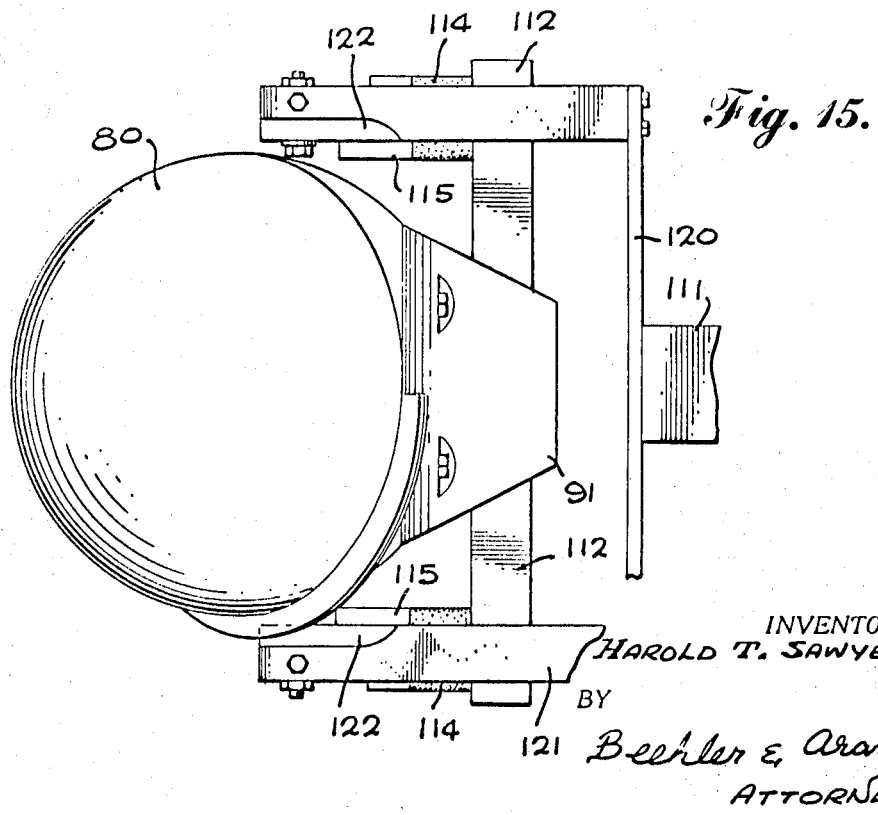
FIG. 15 is a plan view taken on the line 15—15 of FIG. 14.

In order to provide an attachment for a handle 110 and handle shaft 111, a channel section 112 is bolted to the underside of the boss 91 by means of bolts 113, seen advantageously in FIGS. 13, 14, and 15. At each end of the channel section 112 is a noise, shock and vibration isolation mount 114 comprising a section of resiliently designed material. A bracket 115 is secured over the isolator mount 114 to the channel section 112 by means of a bolt 116 provided with an appropriate nut 117 and 118. A yoke 120 may be secured to the lower end of the handle shaft 111 with a leg 121 at each end provided with an extension 122 pivotally secured to the respective bracket 115 by a bolt 123 and nut 124, or by other conventional means.

Mounted as described, the pivotal connections formed by the bolt 123 are more or less at the center of mass and also relatively close to whatever surface the tool holding plate beam 81 might be applied so that the tool holding plate beam 81 can be shifted readily over the surface by the handle and the handle pivoted up or down depending upon the need to manipulate it appropriately.

On those occasions where some liquid supply is to be provided, as for example, for a fabric cleaning tool, a supply tank 130 is mounted on the handle shaft 111. An outlet pipe 131 feeds liquid to a manifold 132 from which extend supply tubes 133. Appropriate fittings 134 attach the supply tubes 133 in each instance so as to pass through the tool holding plate beam 81 to the accumulator chamber (not shown). By making the supply tubes 133 of flexible material, the handle shaft 111 can be pivoted freely without interfering with the connections of the supply tubes 133 between the manifold and the tool holding plate beam 81.

As a further convenience a fitting 135 may be provided to accommodate an electric lead connection 136 so that electric wires may extend through a passage 137 in the boss 91 and by this means be led into the chamber 87 for connection to the motor 88.

Having described the invention, what is claimed as new in support of Letters Patent is:

1. In the conditioning of material by use of a tool holder and a tool with a partially closed chamber in association therewith for application of a fluid to the material the method comprising:
mechanically generating an acoustic wave energy source in the tool holder at a selected forcing frequency and directing compression sound waves therefrom in a path substantially perpendicular to the surface of the material to be conditioned, interposing in said path a cellular resilient foam material having the ability to vibrate at or near resonance and at the frequency and amplitude of said forcing frequency, transmitting said vibration through the foam material to the tool and setting up vibration in said tool thereby at or near its own natural frequency and that of the forcing frequency and excluding from the tool motion other than motion resulting from said vibration, introducing a fluid in said chamber, setting up cavitation in said fluid while in the chamber of said tool at a frequency approaching resonance, projecting said fluid in the form of foaming fluid from the tool to the material to be conditioned and continuing to transmit vibration through the foaming fluid to said last identified material until the last identified material has been brought to a desired condition.

2. The method of claim 1 wherein the fluid is in liquid form and comprises a cleaning fluid for removing dirt from the material.

3. The method of claim 1 wherein the fluid is a dye for dyeing the material to be conditioned.

4. The method of claim 1 including the steps of removing the fluid in the form of foam from the material to be conditioned, subjecting the material to be conditioned to a second application of acoustic energy without application of additional fluid, whereby to bring fluid previously applied to the material to be conditioned to the surface in the form of foaming fluid, and then removing said previously applied fluid from the material to be conditioned.

5. The method of claim 4 wherein the fluid in the form of foam is removed on each occasion by vacuum action.

6. The method of claim 1 including providing relatively thin inner and outer walls on opposite sides of said chamber, separating said walls by a distance of about eight times the thickness of the respective plates to form a relatively narrow space for said chamber and providing a multiplicity of paths through said outer plate for passage of said foaming fluid.

7. The method of claim 1 including limiting the source of said wave energy in the tool holder to a single location at substantially the midportion of said tool holder.

References Cited
UNITED STATES PATENTS

| | | |
|---|---|---|
| 2,789,031 | 4/1957 | Caronia. |
| 2,975,448 | 3/1961 | Glaser. |
| 2,980,123 | 4/1961 | Lemelson. |
| 2,987,906 | 6/1961 | Bourland. |
| 3,066,686 | 12/1962 | O'Neill. |
| 3,089,790 | 5/1963 | Balamath et al. |
| 3,134,990 | 6/1964 | Bodine, Jr. |
| 3,357,033 | 12/1967 | Sawyer. |
| 3,402,009 | 9/1968 | Sawyer. |

FOREIGN PATENTS

| | | |
|---|---|---|
| 1,292,518 | 3/1962 | France. |

WALTER A. SCHEEL, Primary Examiner

L. G. MACHLIN, Assistant Examiner

U.S. Cl. X.R.
15—92, 320, 379